United States Patent
Huang et al.

(10) Patent No.: US 10,938,519 B2
(45) Date of Patent: Mar. 2, 2021

(54) RESOURCE (RE) MAPPING RULE FOR UPLINK CONTROL INFORMATION (UCI) PIGGYBACK ON PHYSICAL UPLINK SHARED CHANNEL (PUSCH)

(71) Applicant: QUALCOMM Incorporated, San Diego, CA (US)

(72) Inventors: Yi Huang, San Diego, CA (US); Peter Gaal, San Diego, CA (US); Wanshi Chen, San Diego, CA (US); Renqiu Wang, San Diego, CA (US); Seyong Park, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/125,011

(22) Filed: Sep. 7, 2018

(65) Prior Publication Data
US 2019/0081737 A1    Mar. 14, 2019

Related U.S. Application Data

(60) Provisional application No. 62/559,464, filed on Sep. 15, 2017, provisional application No. 62/557,088, filed on Sep. 11, 2017.

(51) Int. Cl.
*H04L 1/16*      (2006.01)
*H04L 1/00*      (2006.01)
(Continued)

(52) U.S. Cl.
CPC ......... *H04L 1/1664* (2013.01); *H04B 7/0456* (2013.01); *H04B 7/0621* (2013.01);
(Continued)

(58) Field of Classification Search
CPC ... H04L 1/1664; H04L 1/1614; H04L 5/0055; H04L 1/0086; H04L 1/1861;
(Continued)

(56) References Cited

U.S. PATENT DOCUMENTS 9,225,448 B2 * 12/2015 Seo .................. H04L 1/1896
2014/0105076 A1 * 4/2014 Yang ............... H04W 72/0413
                                              370/280
(Continued)

OTHER PUBLICATIONS

Huawei, et al: "On UCI Multiplexing," 3GPP Draft; R1-1715404, 3rd Generation Partnership Project (3GPP), Mobile Competence Centre; 650, Route Des Lucioles; F-06921 Sophia-Antipolis Cedex; France, vol. RAN WG1, No. Nagoya, Japan; 20170918-20170921, Sep. 9, 2017, XP051328967, 7 pages, Retrieved from the Internet: URL: http://www.3gpp.org/ftp/tsg_ran/WG1_RL1/TSGR1_AH/NR_AH_1709/Docs/ [retrieved on Sep. 9, 2017].
(Continued)

*Primary Examiner* — Fitwi Y Hailegiorgis
(74) *Attorney, Agent, or Firm* — Michael J. DeHaemer, Jr.

(57) ABSTRACT

Certain aspects of the present disclosure relate to methods and apparatus relating to an RE mapping rule for UCI piggyback on PUSCH. For example, a method may include determining a set of uplink resources to use for transmitting acknowledgment (ACK) information in a physical uplink shared channel (PUSCH) transmission, wherein the determination is based at least in part on a payload size of the ACK information, and transmitting the ACK information using the determined set of uplink resources.

17 Claims, 12 Drawing Sheets

(51) Int. Cl.
*H04L 1/18* (2006.01)
*H04B 7/0456* (2017.01)
*H04B 7/06* (2006.01)
*H04L 5/00* (2006.01)
*H04W 72/04* (2009.01)

(52) U.S. Cl.
CPC .......... *H04L 1/0026* (2013.01); *H04L 1/0068* (2013.01); *H04L 1/0086* (2013.01); *H04L 1/1614* (2013.01); *H04L 1/1671* (2013.01); *H04L 1/1861* (2013.01); *H04L 5/0055* (2013.01); *H04W 72/0413* (2013.01)

(58) Field of Classification Search
CPC ... H04L 1/0026; H04L 1/0068; H04L 1/1671; H04B 7/0456; H04B 7/0621; H04W 72/0413
USPC .................................. 375/262; 370/280, 330
See application file for complete search history.

(56) References Cited

U.S. PATENT DOCUMENTS

| | | | |
|---|---|---|---|
| 2018/0110041 A1* | 4/2018 | Bendlin | H04L 5/0007 |
| 2019/0068317 A1* | 2/2019 | Babaei | H04W 72/14 |
| 2019/0150187 A1* | 5/2019 | Park | H04L 5/0053 370/330 |

OTHER PUBLICATIONS

Partial International Search Report—PCT/US2018/050150—ISA/EPO—dated Dec. 10, 2018.
Vivo: "Discussion on UCI Piggyback to PUSCH," 3GPP Draft; R1-1712859_Discussion on UCI Piggyback to PUSCH, 3rd Generation Partnership Project (3GPP), Mobile Competence Centre; 650, Route Des Lucioles; F-06921 Sophia-Antipolis Cedex; France, vol. RAN WG1, No. Prague, P.R. Czechia; 20170821-20170825, Aug. 20, 2017, XP051315671, 3 pages, Retrieved from the Internet: URL: http://www.3gpp.org/ftp/Meetings_3GPP_SYNC/RAN1/Docs/ [retrieved on Aug. 20, 2017].
International Search Report and Written Opinion—PCT/US2018/050150—ISA/EPO—dated Apr. 8, 2019.
Qualcomm Incorporated: "UCI Piggyback on PUSCH", 3GPP Draft, R1-1713437 UCI Piggyback on PUSCH, 3rd Generation Partnership Project (3GPP), Mobile Competence Centre, 650, Route Des Lucioles, F-06921 Sophia-Antipolis Cedex, France, vol. RAN WG1, No. Prague, Czech Republic, 20170821-20170825, Aug. 20, 2017 (Aug. 20, 2017), XP051316239, 4 Pages, Retrieved from the Internet:URL:http://www.3gpp.org/ftp/Meetings_3GPP_SYNC/RAN1/Docs/ [retrieved on Aug. 20, 2017].
Samsung: "CSI Reporting and UCI Multiplexing", 3GPP Draft, R1-1713589 NR CSI UCI, 3rd Generation Partnership Project (3GPP), Mobile Competence Centre, 650, Route Des Lucioles, F-06921 Sophia-Antipolis Cedex, France, vol. RAN WG1, No. Prague, P.R. Czechia, 20170821-20170825, Aug. 20, 2017 (Aug. 20, 2017), XP051316389, 4 Pages, Retrieved from the Internet: URL:http://www.3gpp.org/ftp/Meetings_3GPP_SYNC/RAN1/Docs/ [retrieved on Aug. 20, 2017], Section 1.

* cited by examiner

RESOURCE (RE) MAPPING RULE FOR UPLINK CONTROL INFORMATION (UCI) PIGGYBACK ON PHYSICAL UPLINK SHARED CHANNEL (PUSCH)

CLAIM OF PRIORITY UNDER 35 U.S.C. § 119

The present Application for Patent claims benefit of U.S. Provisional Patent Application Ser. No. 62/557,088, filed Sep. 11, 2017 and U.S. Provisional Patent Application Ser. No. 62/559,464, filed Sep. 15, 2017, assigned to the assignee hereof and hereby expressly incorporated by reference herein.

BACKGROUND

Field of the Disclosure

The present disclosure relates generally to communication systems, and more particularly, to methods and apparatus relating to a resource (RE) mapping rule for uplink control information (UCI) piggyback on physical uplink shared channel (PUSCH).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects generally include methods, apparatus, systems, computer readable mediums, and processing systems, as substantially described herein with reference to and as illustrated by the accompanying drawings.

Certain aspects provide a method for wireless communication. The method generally includes determining a set of uplink resources to use for transmitting uplink control information (UCI) in a physical uplink shared channel (PUSCH) transmission, wherein the determination is based at least in part on a payload size of the UCI, and transmitting the UCI using the determined set of uplink resources.

Certain aspects provide an apparatus for wireless communications by a user equipment (UE). The apparatus generally includes means for determining a set of uplink resources to use for transmitting uplink control information (UCI) in a physical uplink shared channel (PUSCH) transmission, wherein the determination is based at least in part on a payload size of the UCI, and means for transmitting the UCI using the determined set of uplink resources.

Certain aspects provide a non-transitory computer readable medium for wireless communication by a user equipment (UE) having instructions stored thereon. The instructions stored thereon include determining a set of uplink resources to use for transmitting uplink control information (UCI) in a physical uplink shared channel (PUSCH) transmission, wherein the determination is based at least in pae and transmitting the UCI using the determined set of uplink resources.

Certain aspects provide an apparatus for wireless communications by a user equipment (UE). The apparatus generally includes at least one processor configured to determine a set of uplink resources to use for transmitting uplink control information (UCI) in a physical uplink shared channel (PUSCH) transmission, wherein the determination is based at least in part on a payload size of the UCI, and a transmitter configured to transmit the UCI using the determined set of uplink resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
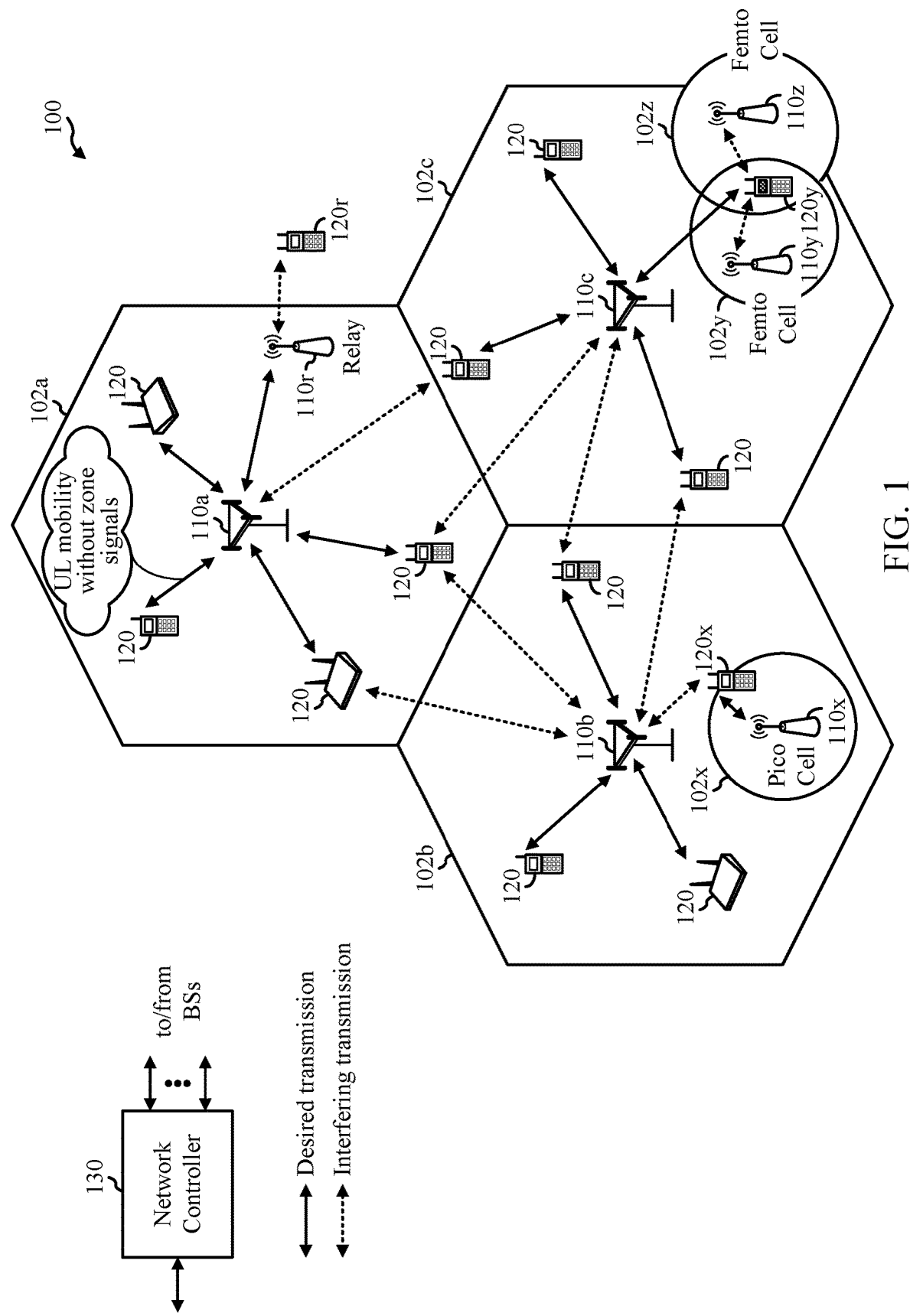
FIG. 1 is a block diagram conceptually illustrating an example telecommunications system, in accordance with certain aspects of the present disclosure.

Aspects of the present disclosure relate to methods and apparatus relating to an RE mapping rule for UCI piggyback on PUSCH. Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). New Radio (NR) (e.g., 5G radio access) is an example of an emerging telecommunication standard. In particular, NR is an emerging wireless communications technology under development in conjunction with the 5G Technology Forum (5GTF). NR is a set of enhancements to the LTE mobile standard promulgated by 3GPP. 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
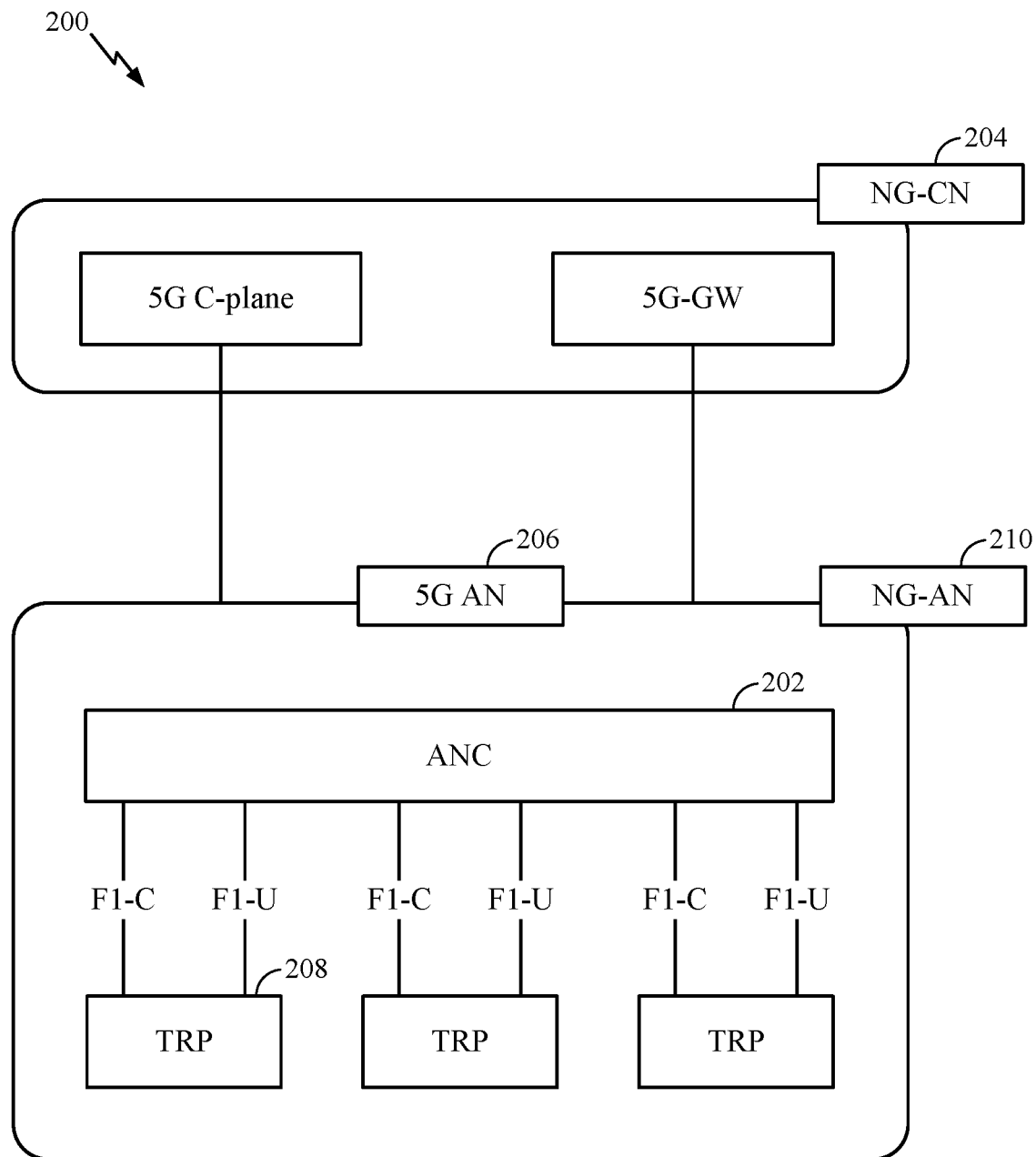
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
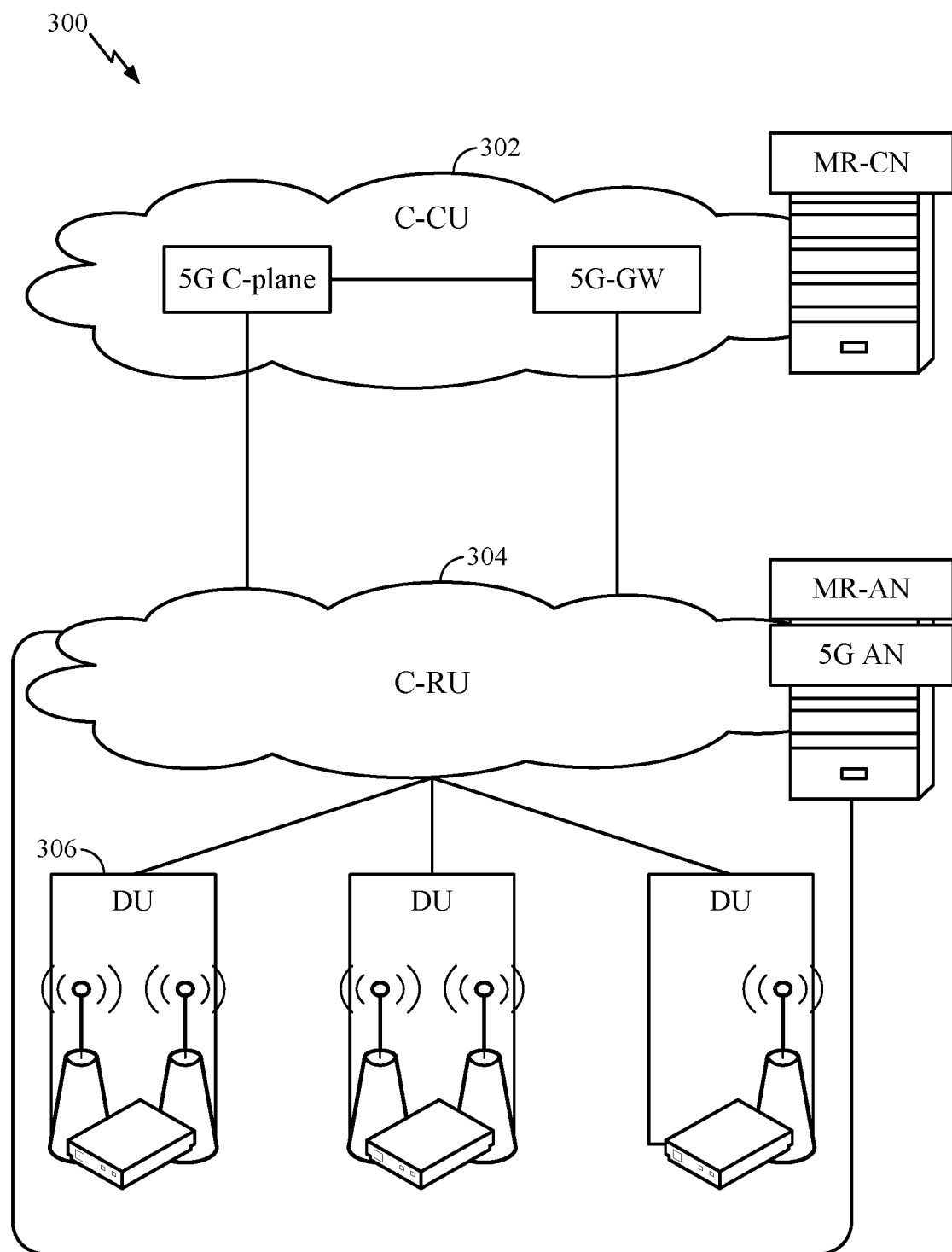
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
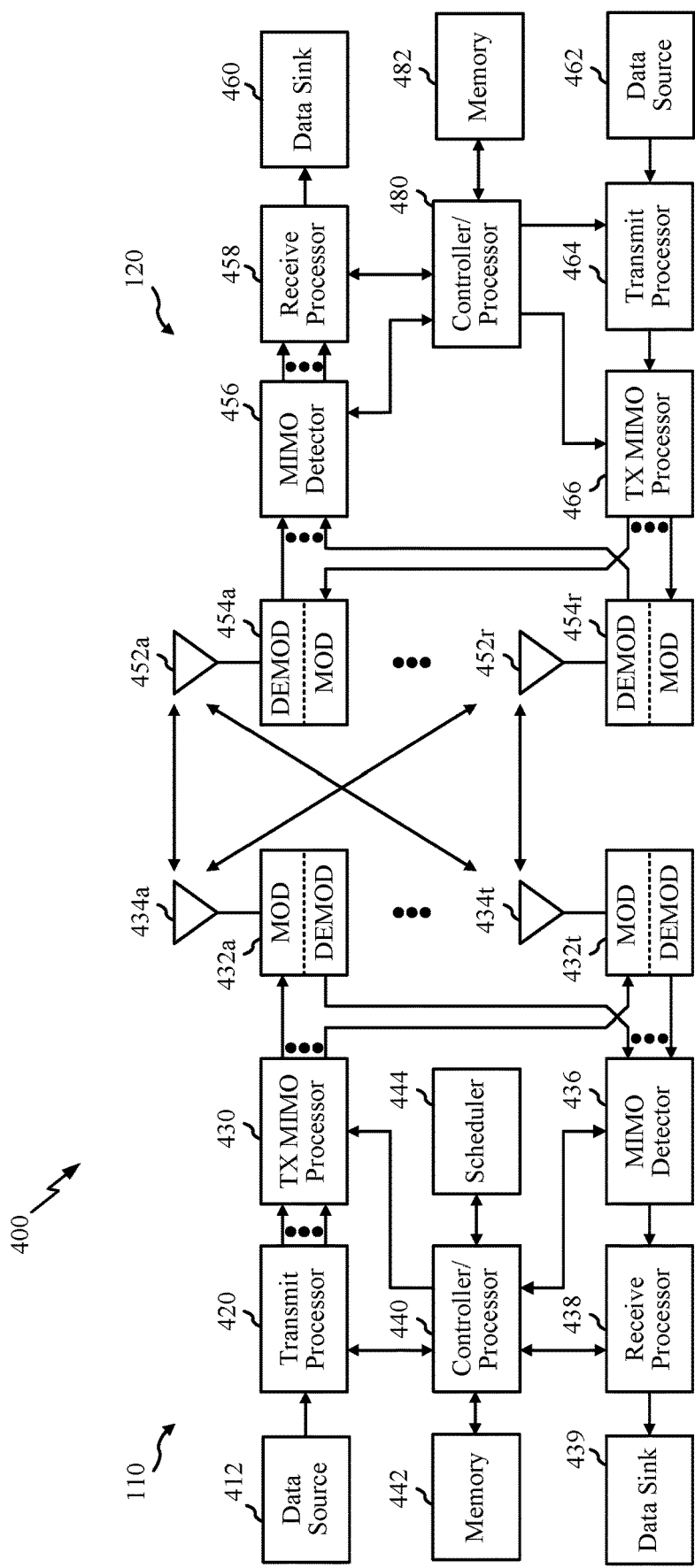
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, MOD/DEMOD 454, processors 466, 458, 464, and/or controller/processor 480 of the UE 120 and/or antennas 434, MOD/DEMOD 432, processors 430, 420, 438, and/or controller/processor 440 of the BS 110 may be used to perform the operations described herein and illustrated with reference to FIG. 8.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (Tx) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the Tx MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processing can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 11 and 13, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
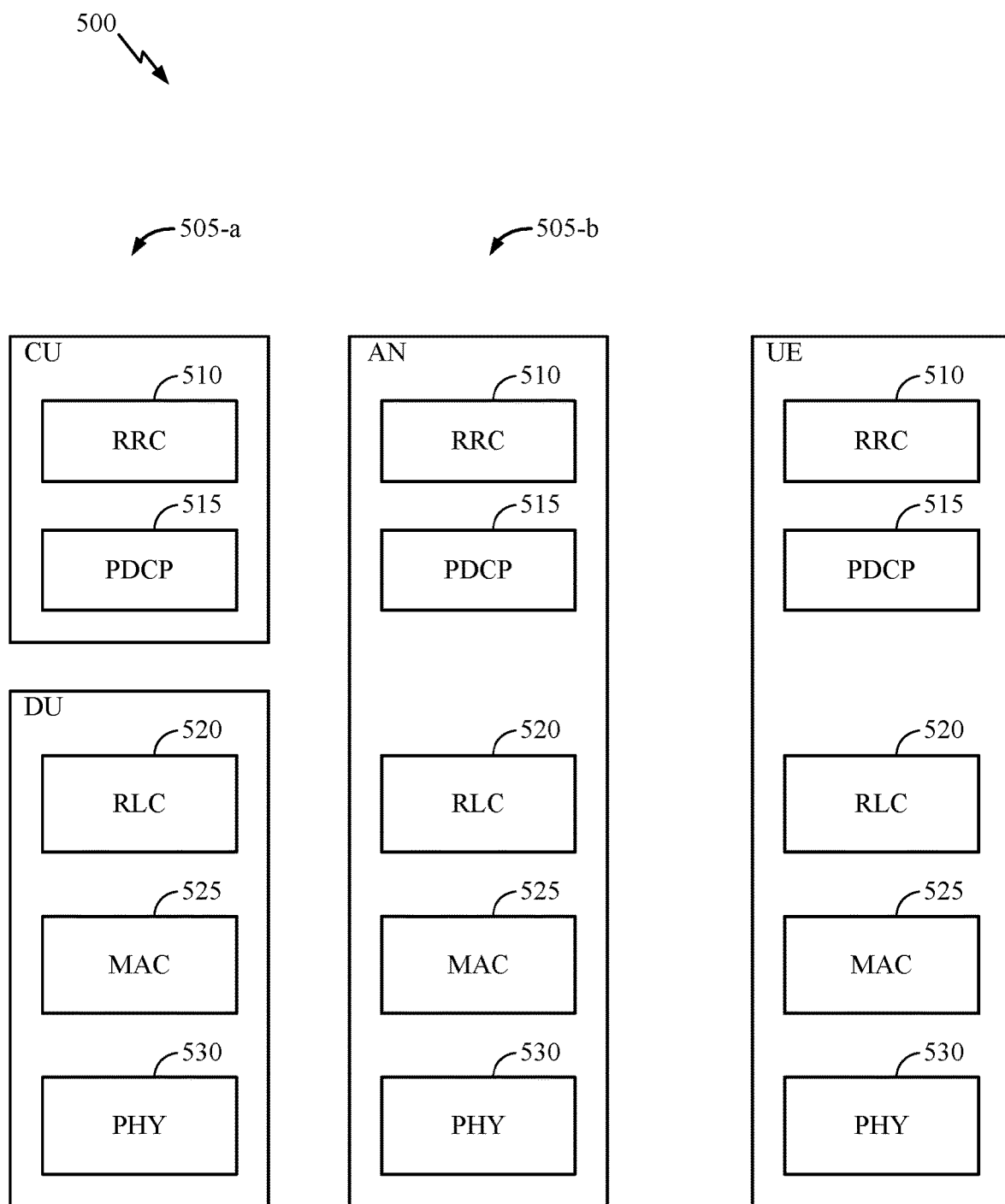
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
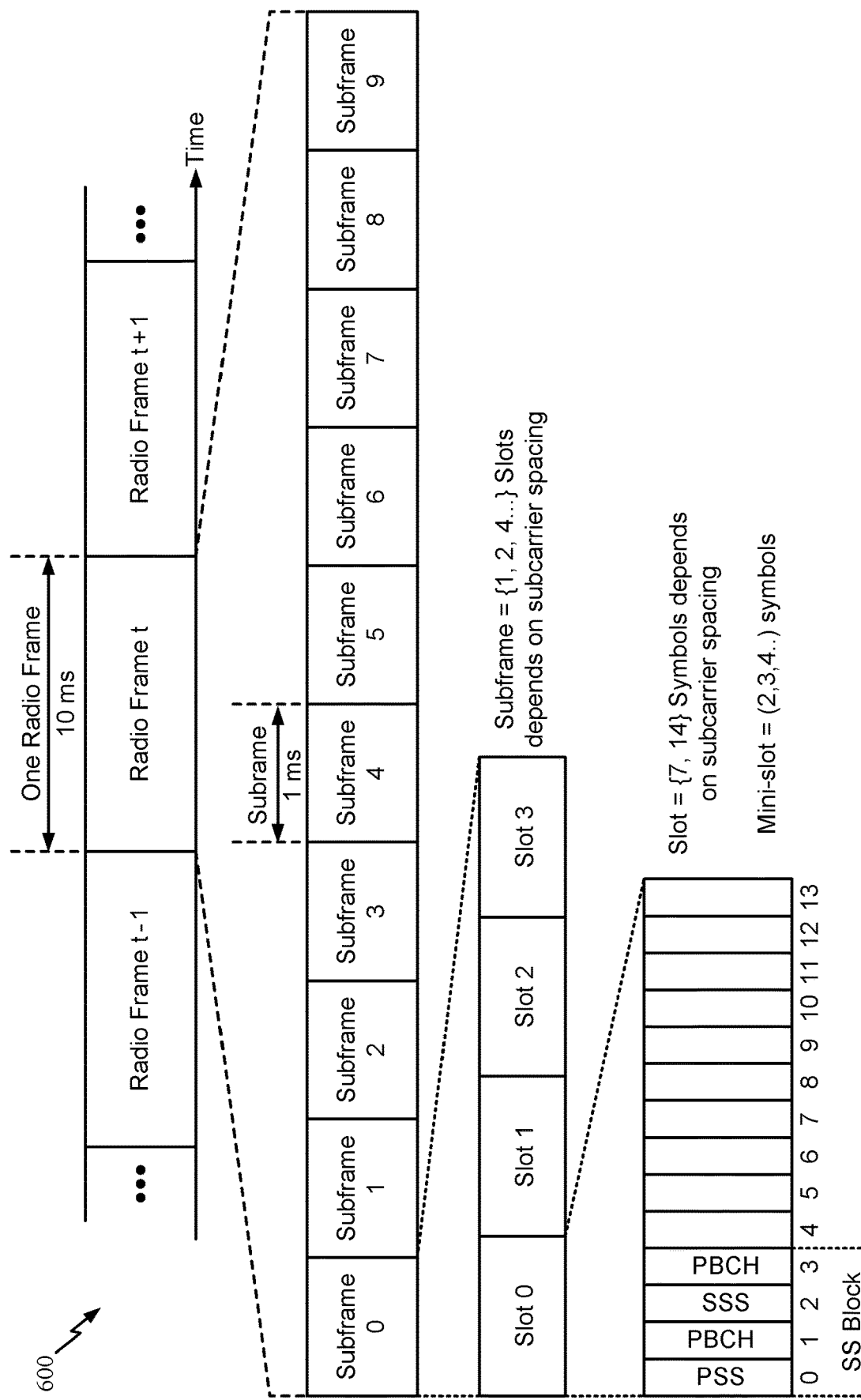
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 4, or 7 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Slot Design

In mobile communication systems conforming to certain wireless communications standards, such as the Long Term Evolution (LTE) standards, certain techniques may be used to increase the reliability of data transmission. For example, after a base station performs an initial transmission operation for a specific data channel, a receiver receiving the transmission attempts to demodulate the data channel during which the receiver performs a cyclic redundancy check (CRC) for the data channel. If, as a result of the check, the initial transmission is successfully demodulated, the receiver may send an acknowledgement (ACK) to the base station to acknowledge the successful demodulation. If, however, the initial transmission is not successfully demodulated, the receiver may send a non-acknowledgement (NACK) to the base station. A channel that transmits ACK/NACK is called a response or an ACK channel.

In some cases, under the LTE standards, an ACK channel may comprise two slots (i.e. one subframe) or 14 symbols, which may be used to transmit an ACK that may comprise one or two bits of information. In some cases, when transmitting ACK channel information, a wireless device may perform frequency hopping. Frequency hopping refers to the practice of repeatedly switching frequencies within a frequency band in order to reduce interference and avoid interception.

Figure 7A:
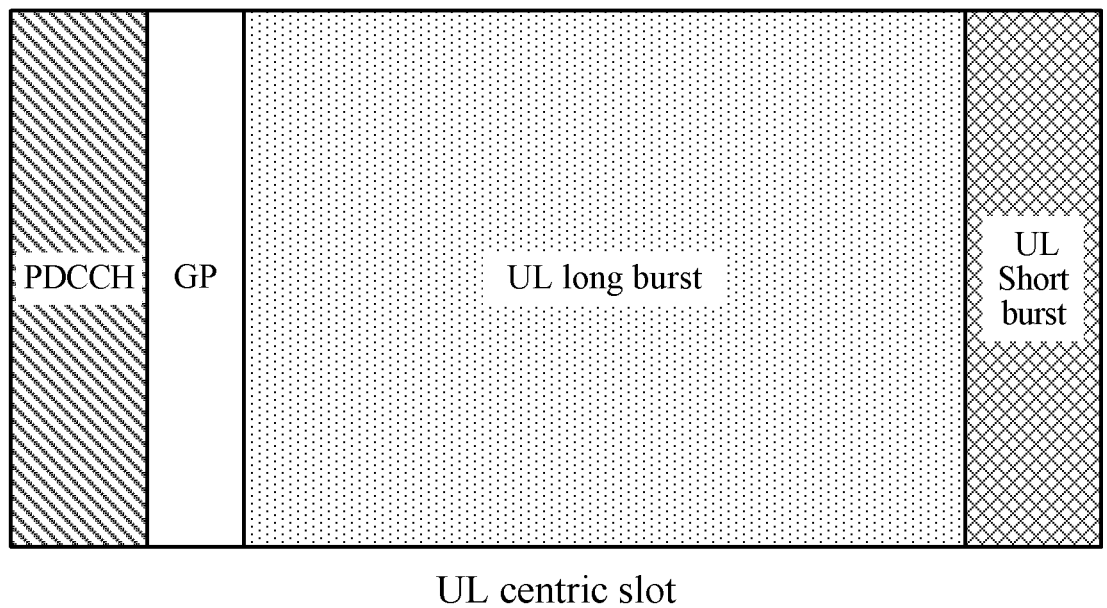
FIGS. 7A and 7B illustrate example uplink and downlink structures, respectively, in accordance with certain aspects of the present disclosure.

Under other wireless communications standards, such as NR, the ACK channel information as well as other information may be transmitted through an uplink structure shown in FIG. 7A. FIG. 7A illustrates an example uplink structure for a UL centric slot with a transmission time interval (TTI) that includes a region for long uplink burst transmissions. The long uplink burst may transmit information such as acknowledgment (ACK), channel quality indicator (CQI), or scheduling request (SR) information.

Figure 7B:
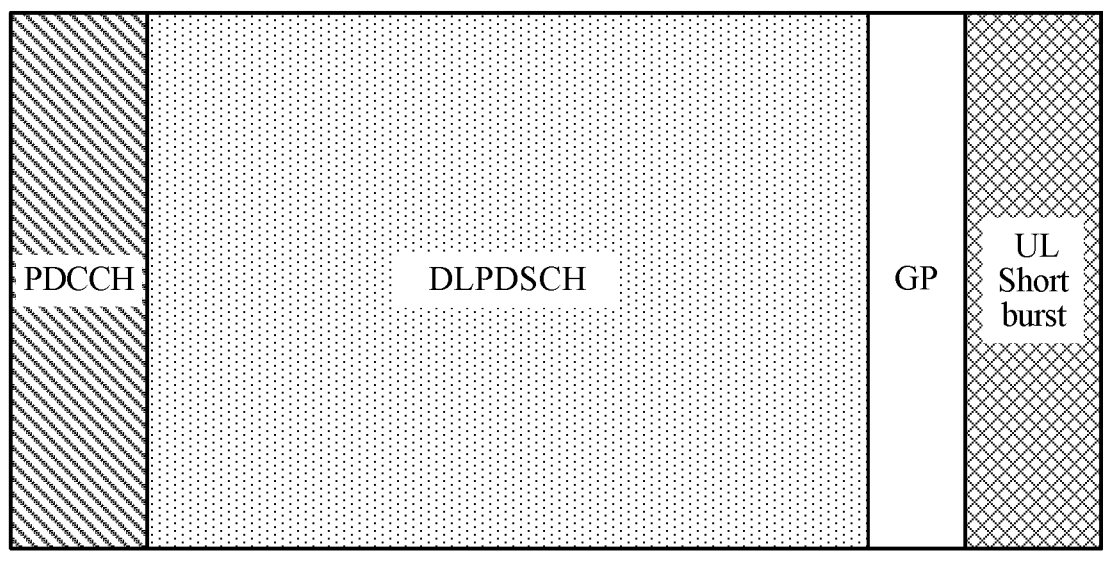

The duration of the region for long uplink burst transmissions, referred to in FIG. 7A as "UL Long Burst," may vary depending on how many symbols are used for the physical downlink control channel (PDCCH), the gap, and the short uplink burst (shown as UL Short Burst), as shown in FIG. 7A. For example, the UL Long Burst may comprise a number of slots (e.g., 4), where the duration of each slot may vary from 4 to 14 symbols. FIG. 7B shows a downlink structure for a DL centric slot having a TTI that includes PDCCH, downlink physical downlink shared channel (PDSCH), a gap, and an uplink short burst. Similar to the UL Long Burst, the duration of the DL PDSCH may also depend on the number of symbols used by the PDCCH, the gap, and the uplink short burst.

As noted above, UL short burst may be 1 or 2 symbols and different approaches may be used to transmit UCI in this duration. For example, according to a "1 symbol" UCI design, 3 or more bits of UCI may be sent using frequency division multiplexing (FDM). For 1 or 2 bits of acknowledgment (ACK) or a 1 bit scheduling request (SR), a sequence based design may be used. For example, an SR may be sent with 1 sequence, on-off keying, and may multiplex up to 12 users per RB. For a 1-bit ACK, 2 sequences may be used, and up to 6 users may be multiplexed per RB. For a 2-bit ACK, 4 sequences may be used and up to 3 users may be multiplexed per RB.

Example Multiplexing Simultaneous PUCCH and PUSCH

There are a number of approaches to multiplex simultaneous PUCCH and PUSCH from a same UE that may be provided. For example, a first approach may include transmitting PUCCH and PUSCH on different RBs, such as, FDM PUCCH and PUSCH. A second approach may include piggybacking PUCCH on assigned PUSCH RBs. Both approaches may be supported in NR.

UCI piggybacking on PUSCH may include, for frequency first mapping, UCI resource mapping principles (e.g., around RS) that may be common for PUSCH with DFT-s-OFDM waveform and CP-OFDM waveform. UCI piggybacking on PUSCH may also include UL data that may be rate-matched around the UCI at least for a periodic CSI report configured by RRC and/or an aperiodic CSI report triggered by UL grant.

In one or more cases, slot-based scheduling for HARQ-ACK with more than two bits may include PUSCH that is rate-matched. In some cases, PUSCH may be punctured for slot-based scheduling for HARQ-ACK with up to two bits. In one or more cases, NR may provide a sufficiently reliable common understanding on HARQ-ACK bits between gNB and UE. In some cases, additional considerations may be taken into account regarding channel multiplexing of PUCCH and PUSCH.

Example Re Mapping Rule for UCI Piggyback on PUSCH

Considerations associated with UCI piggybacking on PUSCH may include how to decide the HARQ-ACK piggyback rule. For example, if PUSCH is punctured by ACK, in the case of a large ACK payload size, the impact to PUSCH decoding performance may be non-negligible. If PUSCH is rate-matched around ACK, in cases where a UE miss-detects DCI, an eNB and UE may have different assumption on the number of ACK bits piggybacked on PUSCH, which may require the eNB to performance blind detection to solve such an ambiguity. Further, as the ACK payload size increases, a number of blind detections that the eNB may need to perform may also increase.

Therefore, in one or more cases, one or more features may be implemented to provide for a reasonable solution to solve one or more of the above considerations. For example, when the number of ACK bits is small (up to 2 bits), PUSCH may be punctured. In such cases, the impact of puncturing on a PUSCH decoding performance may be small. In cases with a large ACK payload size, to avoid significant PUSCH performance degradation, rate-matching may be applied. In one or more cases, other features may be implemented to address ACK payload size ambiguity at an eNB side.

Figure 8:
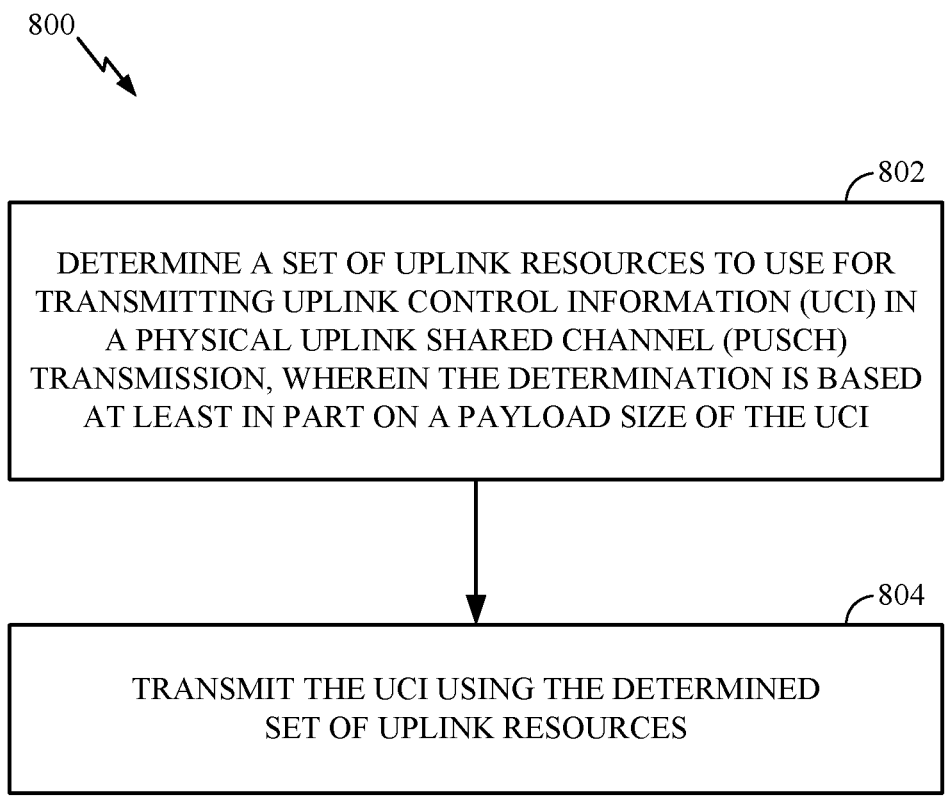
FIG. 8 illustrates example operations for wireless communications by a user equipment (UE), in accordance with certain aspects of the present disclosure.

Aspects of the present disclosure provide techniques for determining a RE mapping rule for UCI piggyback on PUSCH. For example, FIG. 8 illustrates example operations for wireless communications by a user equipment (UE), in accordance with certain aspects of the present disclosure.

Operations 800 begin, at 802, by determining a set of uplink resources to use for transmitting uplink control information (UCI) in a physical uplink shared channel (PUSCH) transmission, wherein the determination is based at least in part on a payload size of the UCI. At 804, the operation 800 may further include transmitting the UCI using the determined set of uplink resources. In some cases, the determination may be based on a mapping rule that is dependent on the payload size.

In accordance with one or more cases, for a resource mapping rule with up to two bits ACK, because ACK piggyback may occur after a low-density parity check (LDPC) encoding, ACK piggyback may be transparent to an LDPC encoder for PUSCH. Therefore, in some cases of puncturing, an ACK of two bits after encoding may be multiple bits and may accordingly puncture a number of REs. In such cases, in order to avoid heavily puncturing one PUSCH code block, one or more cases may include distributing ACK REs across all UL symbols to share the impact of puncturing onto all PUSCH code blocks. Another advantage of time distributed mapping may include time diversity for the ACK payload.

To achieve frequency diversity, one or more cases may include distributing ACK REs in the frequency domain. One potential issue is that the ACK REs may be far away from a demodulated reference signal (DMRS) and may suffer from worse channel estimation at high Doppler. Accordingly, in one or more cases, an additional DMRS symbol may be added at high Doppler for PUSCH decoding performance. Furthermore, in one or more cases, the ACK may be quadrature phase shift key (QPSK) modulated and protected with low code rate with a $\beta_{offset}$. In such cases, an emphasis may be placed on PUSCH symbols which are far away from DMRS before focusing on ACK performance.

In one or more cases, for an ACK with more than two bits, when ACK rate-matching PUSCH is provided, there may not be any impact of ACK puncturing PUSCH. In some cases, the ACK may be mapped to REs close to DMRS to take advantage of potentially improved channel estimation. In other cases, an ACK with more than two bits can be jointly encoded with RI. This may be provided because rank information (RI) and ACK may have similar decoding performance requirement and both may be rate-matched around PUSCH.

Figure 9:
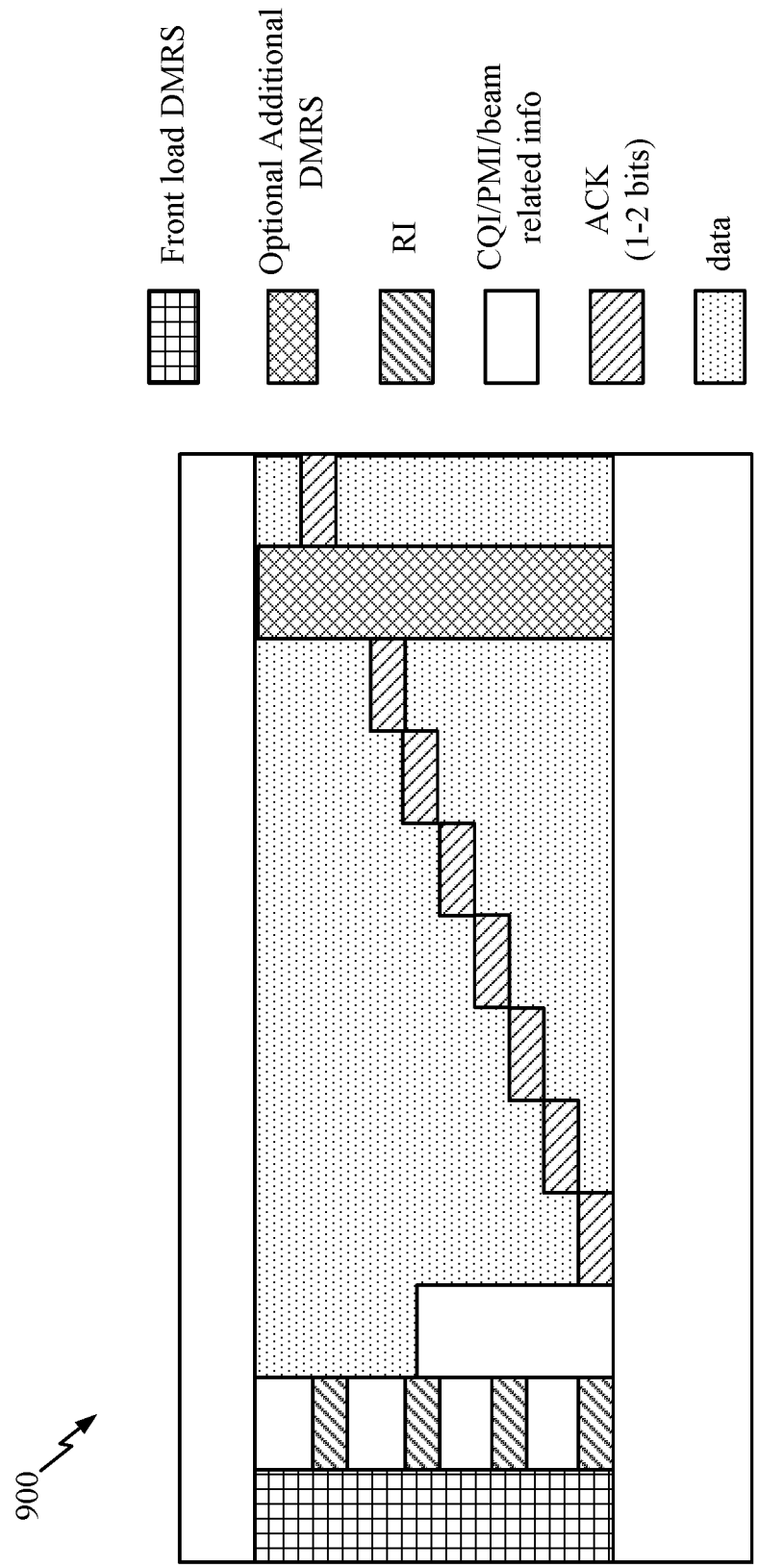
FIG. 9 illustrates resource mapping for UCI on PUSCH with an ACK of one or two bits, in accordance with certain aspects of the present disclosure.
Figure 10:
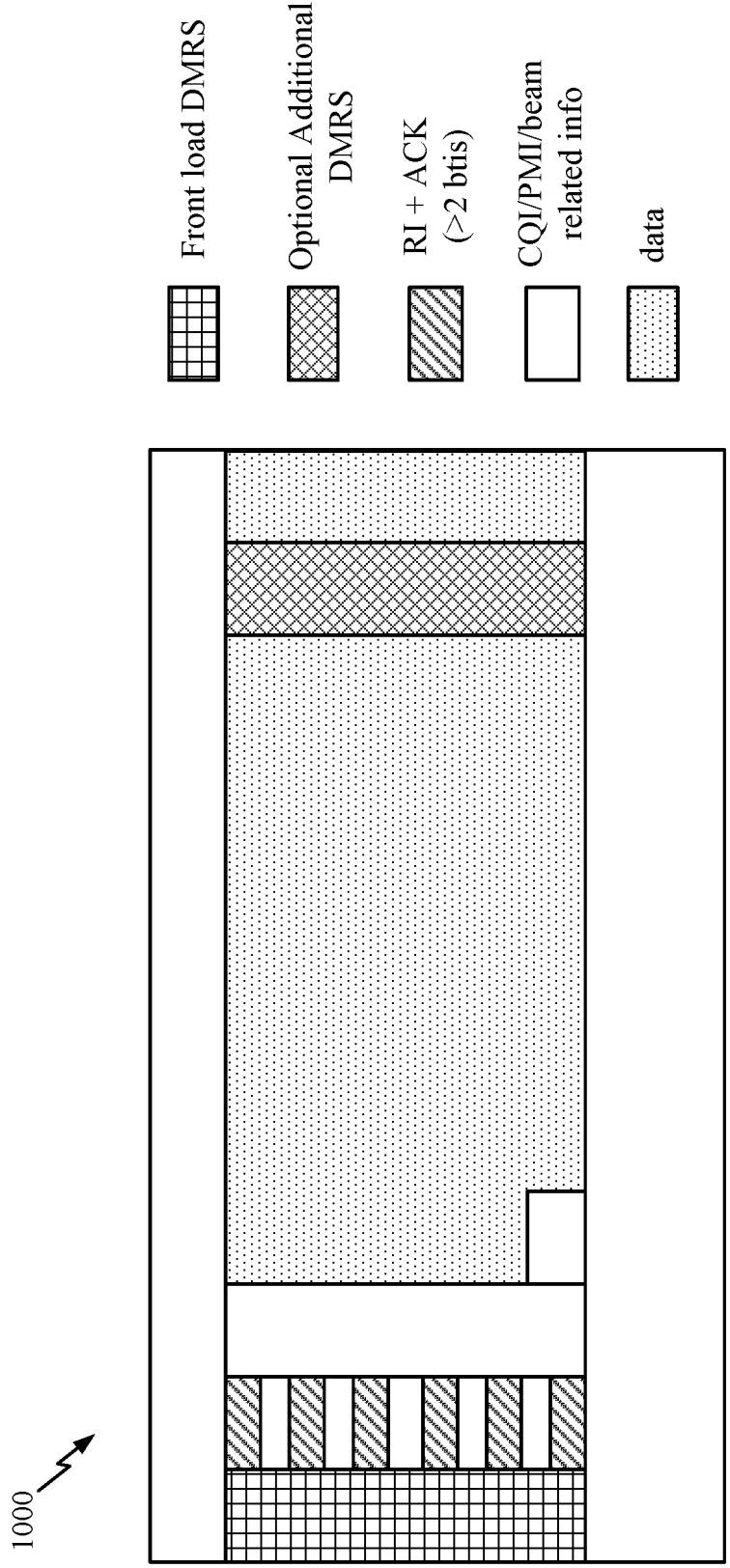
FIG. 10 illustrates resource mapping for UCI on PUSCH with an ACK of more than two bits, in accordance with certain aspects of the present disclosure.

In accordance with one or more cases, a resource mapping rule may depend on ACK payload size, examples of which are show in FIGS. 9 and 10.

Specifically, FIG. 9 illustrates resource mapping 900 for UCI on PUSCH with an ACK of one or two bits, in accordance with certain aspects of the present disclosure. As shown, ACKs that are up to two bits may be mapped to REs distributed in time and frequency.

FIG. 10 illustrates resource mapping 1000 for UCI on PUSCH with an ACK of more than two bits, in accordance with certain aspects of the present disclosure. As shown, ACKs that are more than two bits may be jointly encoded with rank information (RI) first, then mapped to REs next to front loaded DMRS.

In one or more cases, RI may be separately encoded with CQI/PMI/beam related information. This may be provided in one or more cases because CQI/PMI/beam related information and payload size may be rank dependent. In some cases, from a timeline perspective, an eNB may prefer to decode RI first in order to determine the number of bits for CQI/PMI/ beam related information.

In one or more cases, RI and CQI/PMI/Beam related information may be separately encoded. In some cases, an aspect in RE mapping rule that may be provided includes making sure ACK and CSI are mapped to orthogonal resources such that ACK does not puncture CSI. For example, the ACK may not puncture a first portion of CSI that is mapped to the orthogonal resources and rather may only puncture a second portion of CSI that is not mapped to orthogonal resources. Specifically, in accordance with one or more cases, ACK and CSI may be mapped to orthogonal REs so ACK does not puncture the portion of CSI mapped to the orthogonal REs.

The amount of UCI resource assigned to each UCI type may be controlled by $\beta_{offset}$ values, which in LTE may be a single value per UCI type semi-statically configured. These offsets may be set either too conservative in order to ensure UCI performance thus leading to negative performance impact on PUSCH, or insufficient to meet UCI performance requirement. Thus, dynamic $\beta_{offset}$ selection for each transmission may be provided. This may be done by semi-statically configuring a few $\beta_{offset}$ values and PDCCH that can then dynamically select which value to be used in the current transmission. In one or more cases, dynamic selection of $\beta_{offset}$ values for UCI on PUSCH may be provided.

In accordance with one or more cases, signaling an indication of a determined set of resources may be provided via a demodulated reference signal (DMRS) transmission. This signaling may include, for example, transmitting a first DMRS sequence to indicate a first set of resources, or the signaling may include transmitting a second DMRS sequence to indicate a second set of resources. In some cases, the first and second DMRS sequences may include complementary sequences.

Particularly, in accordance with one or more cases, one bit may be provided to modulate DMRS to signal an eNB about an UE's behavior regarding UCI piggyback on PUSCH.

In some cases, at least two UCI piggyback rules, which may also be called resource mapping rules, may be defined as shown in FIG. 9 and FIG. 10 that may depend on ACK payload size. Particularly, the rules may depend on the ACK payload size being either greater than or equal to two bits or less than two bits. Depending on the ACK payload, the UE may implement piggyback UCI on PUSCH differently.

In some cases, a UE may miss a DL grant for PDSCH. When this occurs the UE and eNB may have different understanding on the value of the ACK payload size. This misunderstanding between the UE and eNB may cause the eNB to have wrong assumption of the UE's piggyback behavior, which may cause eNB reception failure for both UCI and PUSCH.

For example, an eNB may schedule three DL PDSCH grants on 3 CCs on slot N. The eNB therefore expects three bits of ACK/NACK feedback on slot N+2, where each one of the bits of the ACK/NACK feedback corresponds to each DL grant. The eNB may also schedule a PUSCH transmission on slot N+2. Because the eNB expects three ACK/NACK bits as feedback on slot N+2, the eNB will assume the UE is capable of implementing a piggyback based on the rules defined in FIG. 10. However, the UE may only successfully decode two DL grants and may fail in decoding the third one. Therefore, the UE thinks the ACK payload size is two bits. Therefore UE may implement a piggyback based on rules defined in FIG. 9 instead. Thus, the eNB may not be able to successfully decode either of the PUSCH or UCI in this case.

In accordance with one or more cases, to solve this issue, one way may include modulating DMRS with one bit of info. The value of this one bit of info b may define what rule to follow. For example, when b=0 this may mean that the UE follows rule 1 (or equivalently UE assumes ACK payload has up to 2 bits), and when b=1 this may mean the UE follows rule 2 (or equivalently UE assumes ACK payload has more than 2 bits). Further, the original DMRS sequence may be referred to as S, where S is an array. In accordance with one or more cases, modulation may done in a number of different way. For example, modulation may include, when b=0, using S as DMRS, or when b=1, using −S as DMRS. Alternatively, modulation may include, when b=0, using −S as DMRS, and when b=1, using S as DMRS. In some case, at the eNB side, eNB may detect DMRS is S or −S. After the detection, the eNB may know whether the UE applies rule 1 or rule 2 to do UCI piggyback on PUSCH.

Accordingly, in one or more cases, including a feature of a one bit signaling from a UE to an eNB embed/modulated on DMRS, may help in remedying a miss-assumption on what the UE behavior regarding piggybacking UCI on PUSCH is, thereby resolving the potential ambiguity caused when a UE misses a DL grant.

In accordance with one or more examples, determining the set of uplink resources may be based on a type of downlink control information (DCI) format used for an uplink grant. Particularly, an eNB may signal an UE to follow different piggyback rule based on different DCI types for UL grant.

Specifically, an approach may include deciding on whether to puncture or implement rate matching based on a DCI format. This may be implemented by defining two sub types for DCI format 0 which contains UL grant. The two types can include a DCI format 0-0 and/or a DCI format 0-1. In the DCI format 0-1, an indicator is added to signal the number of ACK bits the UE should feedback. In DCI format 0-0, such an indicator may not be included. In one or more cases, the DCI format (0-1), may include an indicator to indicate the number of ACK bits UE should feedback (denoted as N). The DCI format (0-0) may not include such an indicator in accordance with one or more cases.

In some scenarios the indicator may not be needed, such as cases where the DCI format 0-0 will be used. Such a scenario may include, but is not limit to, 1 component carrier (CC) FDD or 1 CC TDD without ACK multiplexing. In this case, the maximum ACK payload size may not exceed two bits. Further, there may be no need to add this indicator in a UL grant. In other cases where a DCI format 0-0 may be used, a UE's ACK feedback may always puncture PUSCH, or may equivalently follow a piggyback rule as shown in FIG. 9.

In other scenarios where an indicator is needed, DCI format 0-1 may be used. A UE may follow N (the signalled # ACK bits in DCI format 0-1) and may decide the UE behavior accordingly. In other cases, with DCI format 0-1, there may be two options for UE behavior. The first option may include, when N<=2, ACK may puncture PUSCH (e.g., following the rule shown in FIG. 9). When N>2, ACK rate-match PUSCH may be implemented (e.g, following the rule shown in FIG. 10). A second option may include that regardless of N value, as long as UE receives DCI format 0-1, ACK rate-match PUSCH may be implemented (e.g., following the rule shown in FIG. 10).

In some cases, when receiving DCI format 0-0 a UE behavior may include an ACK always puncturing PUSCH, as shown in FIG. 9. In other cases, the UE may receive DCI format 0-1 and in response may implement one or two different options. The first option includes an ACK that may puncture PUSCH as shown in FIG. 9 or may rate-match PUSCH as shown in FIG. 10 depending on the value N signaled in DCI format 0-1. The second option includes rate-matching PUSCH regardless of N, as shown in FIG. 10.

An eNB behavior may include sending a UL grant with DCI format 0-0 or DCI format 0-1 (with N value configured) depends on operation scenarios. The eNB may also receive PUSCH including piggybacked ACK bits. If the eNB sent DCI format 0-0, it may assume UE's ACK always puncture PUSCH (e.g., follow rule 1 shown in FIG. 9) to decode PUSCH, ACK, and other UCI. In other cases, if the eNB sent DCI format 0-1 the eNB may implement at least one of two options. The first option includes, assuming that the UE follows the N value to determine UCI piggyback rule, having the eNB apply different decoding procedures depending on the N value as well. The second option includes, assuming the UE rate-matches PUSCH (e.g. rule 2 in FIG. 10) regardless of N, the eNB applies the same decoding procedures regardless of N value.

In accordance with one or more cases, in addition to the number of ACK bits, inclusion of DL grant information into the UL grant may be provided. The information may include (but is not limited to) rank, a code block group (CBG) based, or a transport block (TB) based transmission. Thus, in a case where a UE missed several DL grants, as long as the UE received the UL grant, UE may still know how to arrange ACK transmission.

This technique may help address one or more scenarios. For example, in a carrier aggregation scenario with five active component carrier (CC), eNB may schedule 3 PDSCH on 3 CCs with 3 DL grants. But the UE may detect only two DL grants and may miss the third one. Assuming that the decoded two DL grants are both scheduling rank 1 TB based PDSCH, then 1 bit ACK for them each may be provided. The missed DL grant may include scheduling rank 1 CBG based PDSCH. Therefore, there may be two CBG in PDSCH so two bits ACK may be needed (one ACK for each code block group (CBG)). In a UL grant, an eNB may configure N=4 because the eNB may expect a total of four bits of ACK feedback. But the UE may feedback only two bits. However, the four bits are needed in feedback but the UE only has two bits available. The UE may feedback the two unknown due to miss-detection of DL grant as NACK artificially. However, the UE does not know which it two bits it should fill with true ACK feedback, and which it should fill with artificial NACK. Accordingly, if DL grants are copied in UL grant, as long as UE decoded UL grant, then the UE knows everything needed and can avoid such a scenario.

In one or more cases, in addition to the one bit info, in the N bit ACK feedback eNB signaled in the DCI format 0-1 for UL grant, the UE may include a header to signal which bit(s) are for acknowledgement of which for DL grant.

In such a scenario, instead of copying DL grant information into a UL grant, another way to address the issue may include letting the UE signal the eNB indicating which ACK bit(s) is for which CC. In one or more cases, the signaling may be added as a header in the N bits that configures UE to feedback. In this example, N may be configured in DCI format 0-1.

Figure 11:
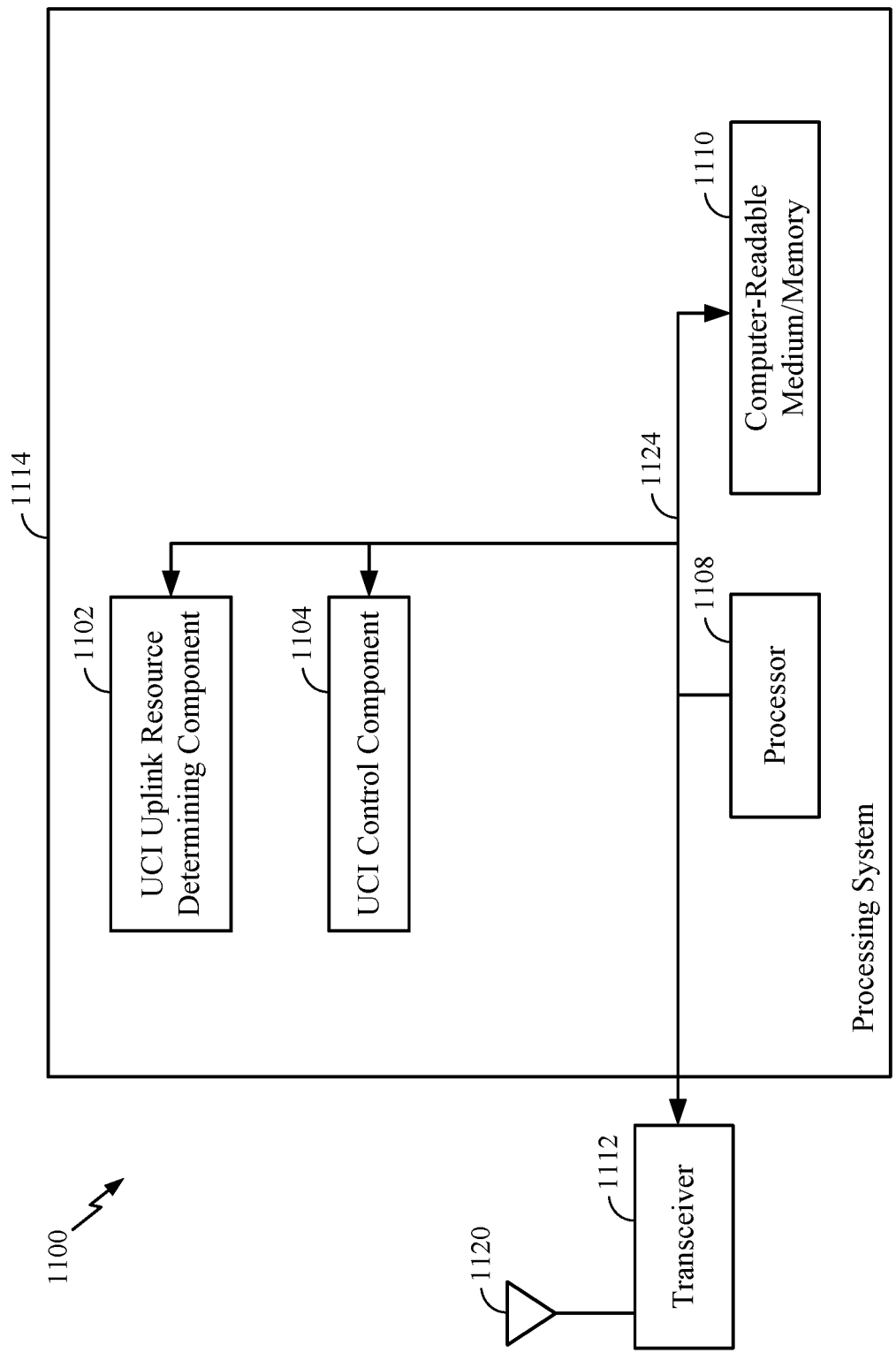
FIG. 11 illustrates a communications device that may include various components configured to perform operations for the techniques described herein in accordance with aspects of the present disclosure.

FIG. 11 illustrates a communications device 1100 that may include various components (e.g., corresponding to means-plus-function components) configured to perform operations for the techniques described herein, such as the operations 800 illustrated in FIG. 8. The communications device 1100 includes a processing system 1114 coupled to a transceiver 1112. The transceiver 1112 is configured to transmit and receive signals for the communications device 1100 via an antenna 1120, such as the various signal described herein. The processing system 1114 may be configured to perform processing functions for the communications device 1100, including processing signals received and/or to be transmitted by the communications device 1100.

The processing system 1114 includes a processor 1108 coupled to a computer-readable medium/memory 1110 via a bus 1124. In certain aspects, the computer-readable medium/memory 1110 is configured to store instructions that when executed by processor 1108, cause the processor 1108 to perform the operations illustrated in FIG. 8, or other operations for performing the various techniques discussed herein. In certain aspects, the processing system 1114 further includes a UCI uplink resource determining component 1102 for performing the operations illustrated at 802 in FIG. 8. The processing system 1114 also includes a UCI control component 1104 for performing the operations illustrated at 804 in FIG. 8.

The UCI uplink resource determining component 1102 and UCI control component 1104 may be coupled to the processor 1108 via bus 1124. In certain aspects, the UCI uplink resource determining component 1102 and UCI control component 1104 may be hardware circuits. In certain aspects, the UCI uplink resource determining component 1102 and UCI control component 1104 may be software components that are executed and run on processor 1108.

The methods described herein comprise one or more steps or actions for achieving the described method or operation or wireless communications. A step and/or actions may be interchanged with one another, or removed or skipped, without departing from the scope of the claims. Unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 8A:
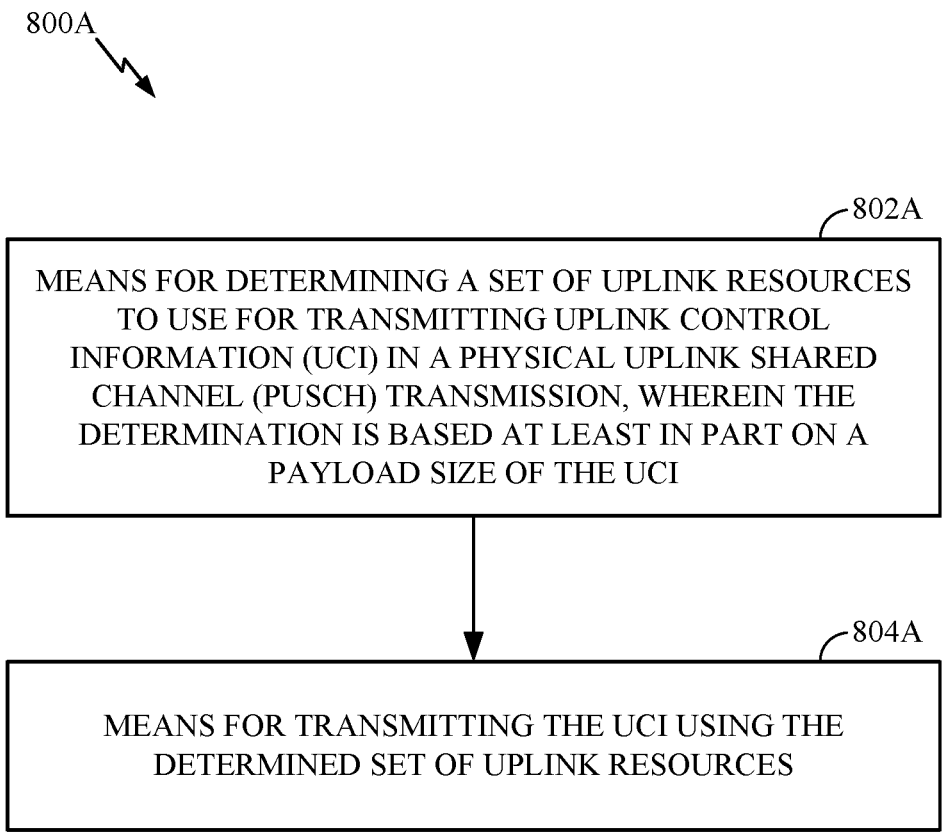
FIG. 8A illustrates example components capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 800 illustrated in FIG. 8 correspond to means 800A illustrated in FIG. 8A. For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for determining, means for transmitting, means for encoding, means or signaling, means for confirming, means for mapping, and/or means for including may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   determining a set of uplink resources to use for transmitting uplink control information (UCI) in a physical uplink shared channel (PUSCH) transmission based at least in part on a payload size of the UCI and a mapping rule that maps acknowledgment (ACK) information and channel state information (CSI) bits to orthogonal resources, wherein the CSI comprises a first portion and a second portion, wherein the first portion is mapped to the orthogonal resources, and wherein the ACK information punctures only the second portion; and
   transmitting the UCI using the determined set of uplink resources.

2. The method of claim 1, further comprising:
   encoding rank information (RI) separately from at least one of channel quality indicator (CQI), preceding matrix indicator (PMI), or beam information; and
   transmitting the separately encoded RI and CQI, PMI, or beam information in the PUSCH transmission.

3. The method of claim 1, further comprising:
   signaling an indication of the determined set of uplink resources via a demodulated reference signal (DMRS) transmission.

4. The method of claim 3, wherein signaling an indication of the determined set of resources via a demodulated reference signal (DMRS) transmission comprises:
   transmitting a first DMRS sequence to indicate a first set of resources; or
   transmitting a second DMRS sequence to indicate a second set of resources.

5. A method for wireless communications by a user equipment (UE), comprising:
   determining a set of uplink resources to use for transmitting uplink control information (UCI) in a physical uplink shared channel (PUSCH) transmission based at least in part on a payload size of the UCI and a dynamically selected offset value used to determine an amount of resources available for the UCI, wherein the offset value is dynamically selected, based on received downlink control information (DCI), from a set of offset values signaled to the UE statically or semi-statically through radio resource control (RRC) signaling;
   transmitting the UCI using the determined set of uplink resources; and
   signaling an indication of the determined set of uplink resources via a demodulated reference signal (DMRS) transmission by transmitting a first DMRS sequence to indicate a first set of resources or transmitting a second DMRS sequence to indicate a second set of resources, wherein the first DMRS sequence and the second DMRS sequence comprise complementary sequences.

6. The method of claim 5, wherein:
   the UCI comprises acknowledgment (ACK) information; and
   at least one type of downlink control information (DCI) format includes an indication of a number of ACK information bits the UE should send using the determined set of uplink resources.

7. A method for wireless communications by a user equipment (UE), comprising:

determining a set of uplink resources to use for transmitting uplink control information (UCI) in a physical uplink shared channel (PUSCH) transmission based at least in part on a payload size of the UCI and a dynamically selected offset value used to determine an amount of resources available for the UCI, wherein the offset value is dynamically selected, based on received downlink control information (DCI), from a set of offset values signaled to the UE statically or semi-statically through radio resource control (RRC) signaling; and transmitting the UCI using the determined set of uplink resources, wherein the UCI comprises acknowledgment (ACK) information, at least one type of downlink control information (DCI) format includes an indication of a number of ACK information bits the UE should send using the determined set of uplink resources, wherein an uplink grant also includes downlink grant information; and the method further comprises determining or confirming how to utilize the number of ACK information bits based on the downlink grant information.

8. The method of claim 7, wherein the downlink grant information comprises at least one of: rank, an indication of a code block group (CBG) based transmission, or an indication of a transport block (TB) based transmission.

9. The method of claim 7, further comprising:
including, in the UCI transmission, an indication of which of the number of ACK information bits are used to acknowledge which downlink grants.

10. An apparatus for wireless communications by a user equipment (UE), comprising:
means for determining a set of uplink resources to use for transmitting uplink control information (UCI) in a physical uplink shared channel (PUSCH) transmission based at least in part on a payload size of the UCI and a mapping rule that maps acknowledgment (ACK) information and channel state information (CSI) bits to orthogonal resources, wherein the CSI comprises a first portion and a second portion, wherein the first portion is mapped to the orthogonal resources, and wherein the ACK information punctures only the second portion; and
means for transmitting the UCI using the determined set of uplink resources.

11. The apparatus of claim 10, further comprising:
means for encoding rank information (RI) separately from at least one of channel quality indicator (CQI), preceding matrix indicator (PMI), or beam information; and
means for transmitting the separately encoded RI and CQI, PMI, or beam information in the PUSCH transmission.

12. The apparatus of claim 10, further comprising:
means for signaling an indication of the determined set of uplink resources via a demodulated reference signal (DMRS) transmission.

13. An apparatus for wireless communications by a user equipment (UE), comprising:
means for determining a set of uplink resources to use for transmitting uplink control information (UCI) in a physical uplink shared channel (PUSCH) transmission based at least in part on a payload size of the UCI and a dynamically selected offset value used to determine an amount of resources available for the UCI, wherein the offset value is dynamically selected, based on received downlink control information (DCI), from a set of offset values signaled to the UE statically or semi-statically through radio resource control (RRC) signaling;

means for transmitting the UCI using the determined set of uplink resources; and means for signaling an indication of the determined set of uplink resources via a demodulated reference signal (DMRS) transmission, wherein means for signaling an indication of the determined set of resources via a demodulated reference signal (DMRS) transmission comprises:

means for transmitting a first DMRS sequence to indicate a first set of resources; or means for transmitting a second DMRS sequence to indicate a second set of resources, wherein the first DMRS sequence and the second DMRS sequence comprise complementary sequences.

14. An apparatus for wireless communications by a user equipment (UE), comprising:
means for determining a set of uplink resources to use for transmitting uplink control information (UCI) in a physical uplink shared channel (PUSCH) transmission based at least in part on a payload size of the UCI and a dynamically selected offset value used to determine an amount of resources available for the UCI, wherein the offset value is dynamically selected, based on received downlink control information (DCI), from a set of offset values signaled to the UE statically or semi-statically through radio resource control (RRC) signaling; and
means for transmitting the UCI using the determined set of uplink resources, wherein:
the UCI comprises acknowledgment (ACK) information; and
at least one type of downlink control information (DCI) format includes an indication of a number of ACK information bits the UE should send using the determined set of uplink resources, wherein:
an uplink grant includes downlink grant information,
the apparatus further comprises means for determining or means for confirming how to utilize the number of ACK information bits based on the downlink grant information, and
the downlink grant information comprises at least one of: rank, an indication of a code block group (CBG) based transmission, or an indication of a transport block (TB) based transmission.

15. The apparatus of claim 14, further comprising:
means for including, in the UCI transmission, an indication of which of the number of ACK information bits are used to acknowledge which downlink grants.

16. A non-transitory computer readable medium for wireless communication by a user equipment (UE) having instructions stored thereon for:
determining a set of uplink resources to use for transmitting uplink control information (UCI) in a physical uplink shared channel (PUSCH) transmission based at least in part on a payload size of the UCI and a mapping rule that maps acknowledgment (ACK) information and channel state information (CSI) bits to orthogonal resources, wherein the CSI comprises a first portion and a second portion, wherein the first portion is mapped to the orthogonal resources, and wherein the ACK information punctures only the second portion; and
transmitting the UCI using the determined set of uplink resources.

17. An apparatus for wireless communications by a user equipment (UE), comprising:
- at least one processor configured to:
  - determine a set of uplink resources to use for transmitting uplink control information (UCI) in a physical uplink shared channel (PUSCH) transmission based at least in part on a payload size of the UCI and a mapping rule that maps acknowledgment (ACK) information and channel state information (CSI) bits to orthogonal resources, wherein the CSI comprises a first portion and a second portion, wherein the first portion is mapped to the orthogonal resources, and wherein the ACK information punctures only the second portion; and
- a transmitter configured to:
  - transmit the UCI using the determined set of uplink resources.

* * * * *